United States Patent
Wilks

(10) Patent No.: US 6,629,679 B1
(45) Date of Patent: Oct. 7, 2003

(54) WALL MOUNT SHELVING SYSTEM

(76) Inventor: Leroy Wilks, 230 Jason Dr., Sarasota, FL (US) 34228

( * ) Notice: Subject to any disclaimer, the term of this patent is extended or adjusted under 35 U.S.C. 154(b) by 2 days.

(21) Appl. No.: 10/011,935

(22) Filed: Nov. 29, 2001

Related U.S. Application Data

(63) Continuation-in-part of application No. 09/938,231, filed on Aug. 23, 2001.

(51) Int. Cl.$^7$ .............................. A47H 1/14; A47F 5/08
(52) U.S. Cl. ..................... 248/251; 248/235; 211/153
(58) Field of Search ................. 248/251, 250, 248/235, 247; 211/153; 16/108, DIG. 41

(56) References Cited

U.S. PATENT DOCUMENTS

| | | | | | |
|---|---|---|---|---|---|
| 913,228 | A | * | 2/1909 | McCarthy | 224/29.5 |
| 2,842,270 | A | * | 7/1958 | Massey | 108/31 |
| 3,687,410 | A | * | 8/1972 | Holmgren | 248/235 |
| 4,187,929 | A | * | 2/1980 | Cyr | 182/222 |
| 4,376,521 | A | * | 3/1983 | Walters | 248/206.3 |
| 4,537,379 | A | * | 8/1985 | Rhoades | 248/222.51 |
| 4,603,781 | A | * | 8/1986 | Ryan, Jr. | 211/90.04 |
| D293,867 | S | * | 1/1988 | Fayerman et al. | D6/572 |
| D299,604 | S | * | 1/1989 | Fayerman et al. | D6/572 |
| 5,026,013 | A | * | 6/1991 | Robbins | 248/221.12 |
| 5,058,847 | A | * | 10/1991 | Arakawa | 248/328 |
| 5,170,723 | A | * | 12/1992 | Lewkowicz | 108/152 |
| 5,544,865 | A | * | 8/1996 | Abbaticchio | 256/67 |
| 5,730,413 | A | * | 3/1998 | Chen | 248/489 |

* cited by examiner

Primary Examiner—Anita King
(74) Attorney, Agent, or Firm—Edward P. Dutkiewicz

(57) ABSTRACT

A mounting system comprises a cylindrical member having an end formed with threads and at least one axial slot there through for supporting a shelf. A generally cylindrical mounting plate has a circumference with threads adapted to releasably couple to the threads of a cylindrical member. The mounting plate has at least one hole there through for attachment to a recipient surface.

5 Claims, 7 Drawing Sheets

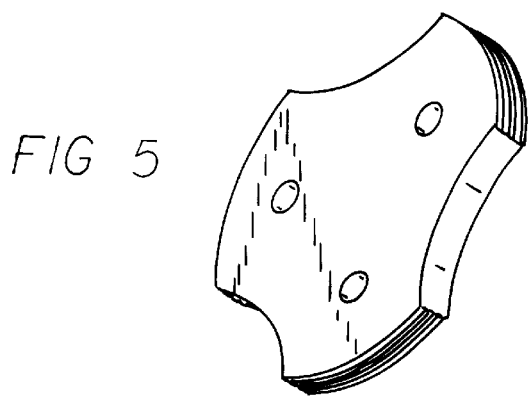
FIG 5
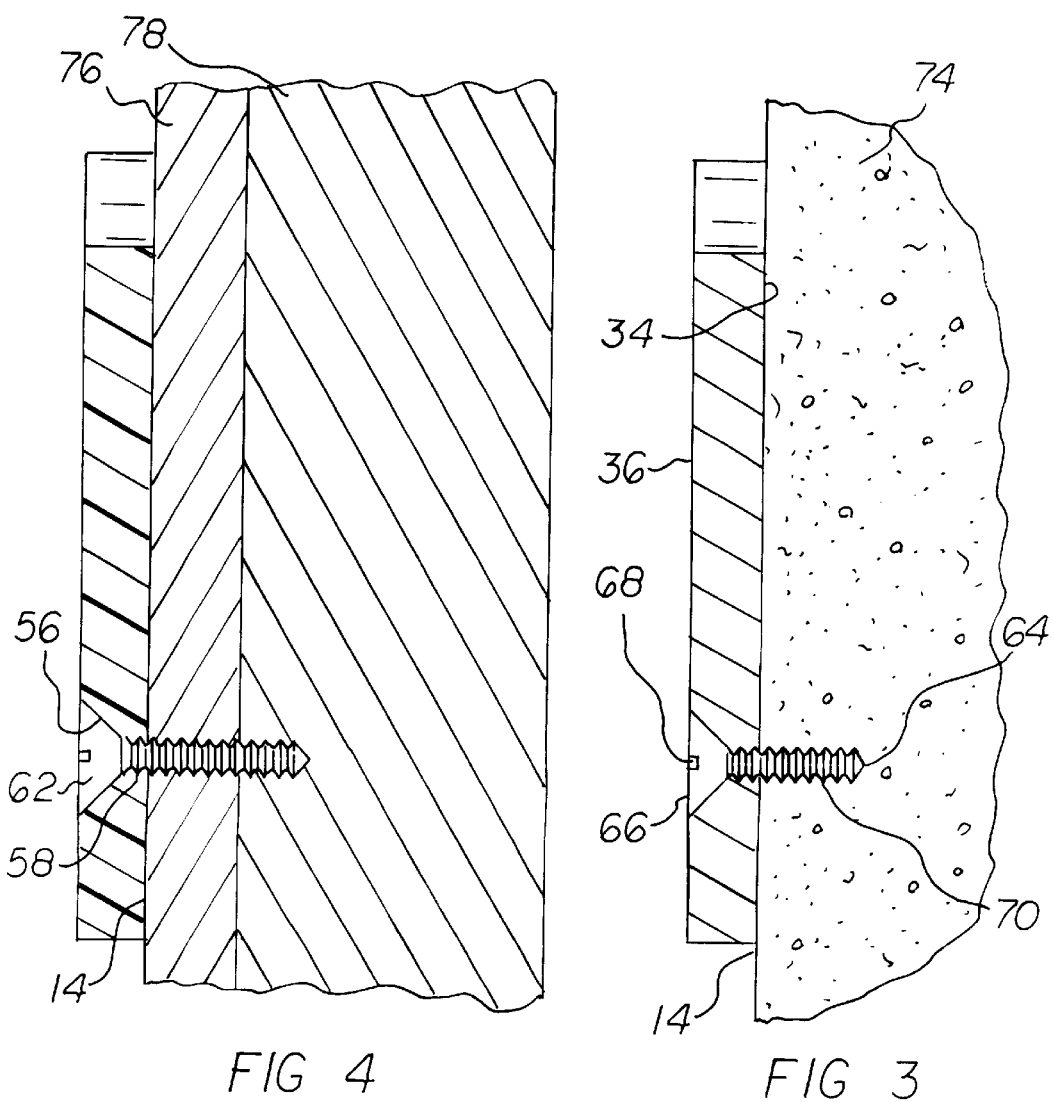
FIG 4
FIG 3

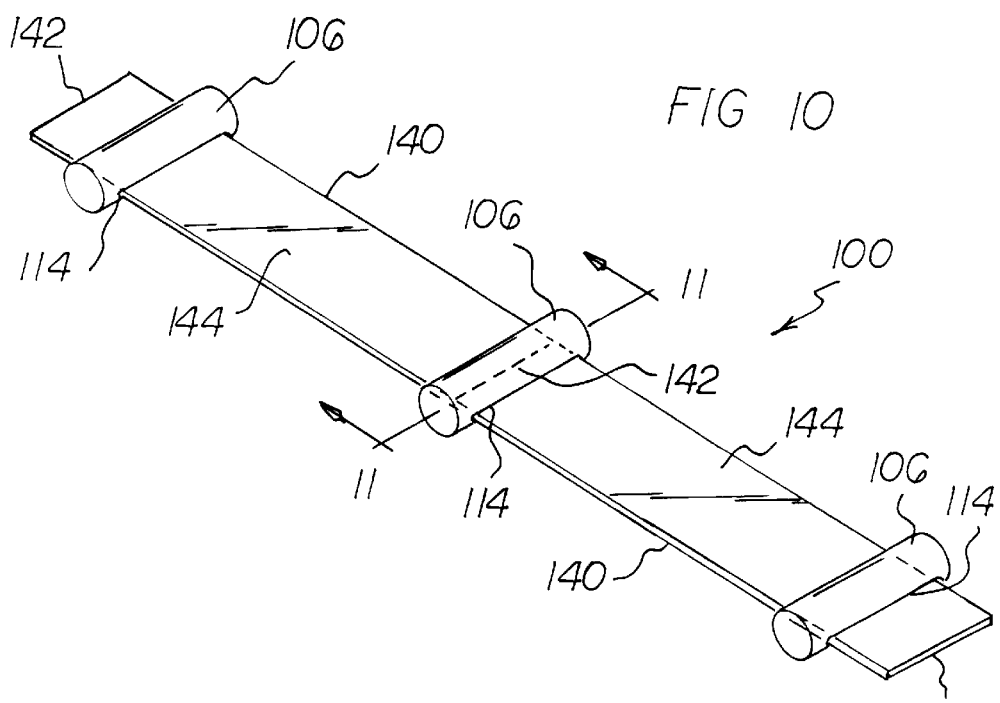
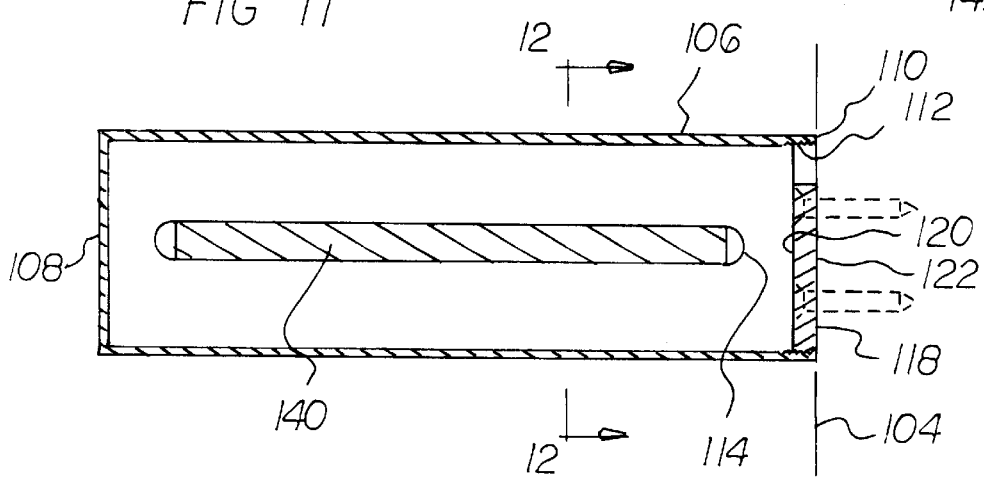

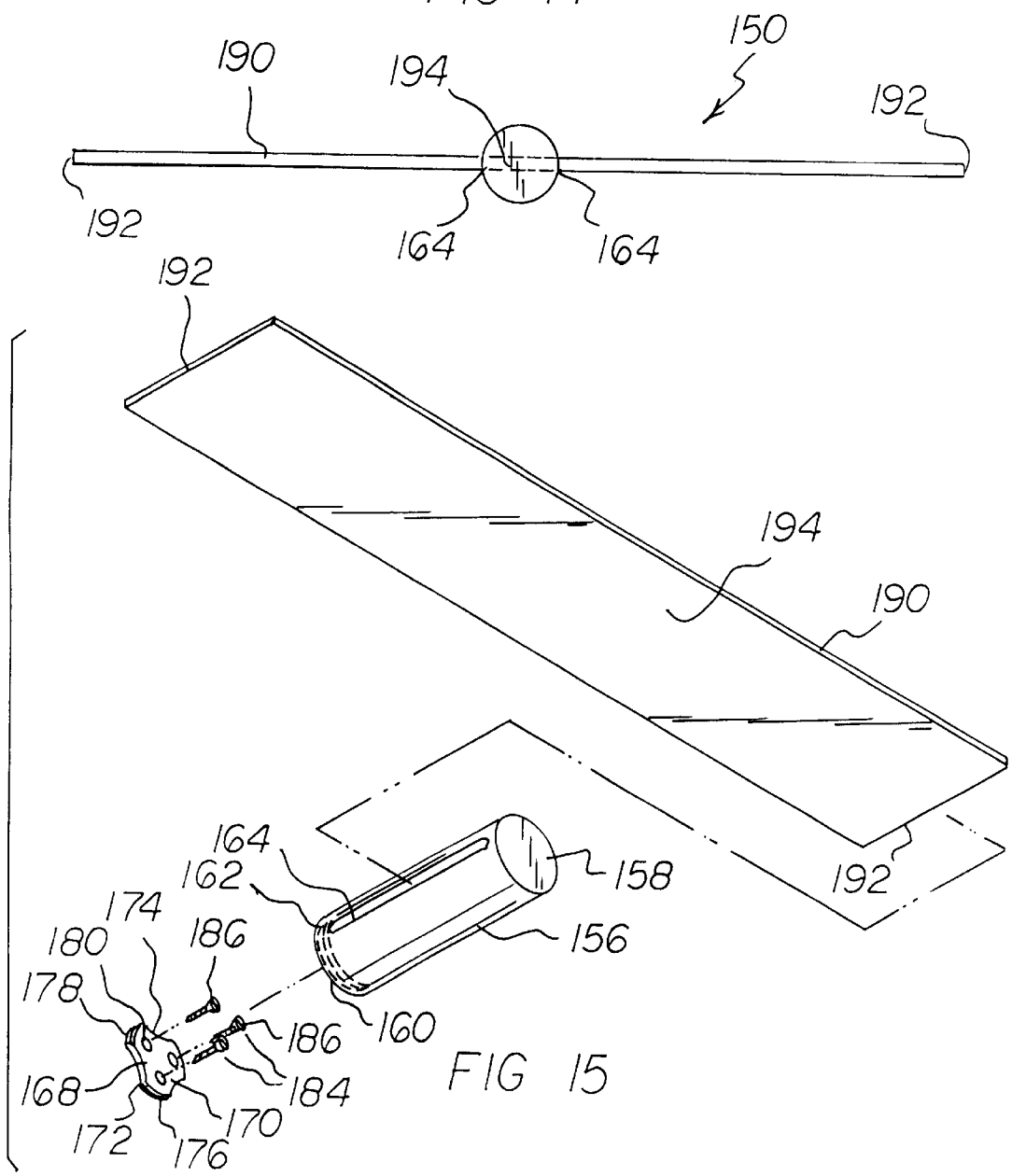

WALL MOUNT SHELVING SYSTEM

RELATED APPLICATION

The present application is a continuation-in-part of U.S. patent application Ser. No. 09/938,231 filed Aug. 23, 2001.

BACKGROUND OF THE INVENTION

1. Field of the Invention

The present invention relates to a shelving system and more particularly pertains to supporting shelving through known methods and apparatuses.

2. Description of the Prior Art

The use of shelves and shelf supports of known designs and configurations is known in the prior art. More specifically, shelves and shelf supports of known designs and configurations previously devised and utilized for the purpose of joining items of hardware through known methods and apparatuses are known to consist basically of familiar, expected, and obvious structural configurations, notwithstanding the myriad of designs encompassed by the crowded prior art which has been developed for the fulfillment of countless objectives and requirements.

While the prior art devices fulfill their respective, particular objectives and requirements, they do not describe a wall mount shelving system that allows coupling internally threaded cylindrical members including rods, pipes and tubes to flat surfaces and to each other.

In this respect, the wall mount shelving system according to the present invention substantially departs from the conventional concepts and designs of the prior art, and in doing so provides an apparatus primarily developed for the purpose of coupling internally threaded cylindrical members including rods, pipes and tubes to flat surfaces and to each other.

Therefore, it can be appreciated that there exists a continuing need for a new and improved wall mount shelving system which can be used for coupling internally threaded cylindrical members including rods, pipes and tubes to flat surfaces and to each other. In this regard, the present invention substantially fulfills this need.

SUMMARY OF THE INVENTION

In view of the foregoing disadvantages inherent in the known types of shelves and shelf supports of known designs and configurations now present in the prior art, the present invention provides an improved wall mount shelving system. As such, the general purpose of the present invention, which will be described subsequently in greater detail, is to provide a new and improved wall mount shelving system and method which has all the advantages of the prior art and none of the disadvantages.

To attain this, the present invention essentially comprises a vertically oriented, rigid, planar, recipient surface. A pair of cylindrical members is next provided. Each cylindrical member has a closed end and an open end with an interior surface and an exterior surface. Each cylindrical member further has female threads formed in the interior surface adjacent to the open end. Each cylindrical member also has axial slots there through at diametrically opposed locations. Each slot has a common short height circumferentially and a long length axially. Next provided is a pair of mounting plates. Each mounting plate has an interior face and an exterior face. The mounting plate has a generally cylindrical, thin, outer circumference. The circumference of each mounting plate has three arcuate concave regions. Each region is about 60 degrees. The regions are equally spaced around the circumference. The circumference of each mounting plate has three arcuate convex regions. Each of the convex regions is about 60 degrees. The convex regions are equally spaced around the circumference between the concave regions. The convex regions each have male threads adapted to releasably couple to the threads of the cylindrical member. Each mounting plate further has a central extent with three beveled holes symmetrically located adjacent to the circumference in proximity to the convex regions. The beveled holes have a large aperture opening in the exterior face of the mounting plate and a small aperture opening in to the interior face of the mounting plate. The interior face is adapted to lie flush with the recipient surface at spaced locations at a common elevation so that the slots of the cylindrical members are in a common first horizontal plane. One of the three concave regions of each mounting plate is adapted to be positioned at the upper most extent of the recipient surface whereby adjacent edges of the convex regions lie laterally spaced when coupled to the planar surface such that their adjacent edges lie in a second horizontal plane above the first horizontal plane for supporting a level during mounting. A plurality of set screws have a pointed end and a head end with a flared top portion with a coupling recess and male threads there between. The screws are adapted to threadedly couple through the mounting plate into the recipient surface such that the pointed end and threads pierce the planar surface and the head end lies within the beveled holes with the flared top portion lying flush with the top face of the mounting plate so that the mounting plate may threadedly receive and support the cylindrical member. Finally, a rectangular rigid planar shelf is provided. The shelf has opposed ends with a central extent there between. The shelf has a thickness slightly less than the height of the slots and a width slightly less than the length of the slots. The shelf has a length slightly greater than the distance between adjacent slots of the spaced cylindrical members and extends through and is supported by the slots of the cylindrical members.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved wall mount shelving system which has all of the advantages of the prior art shelves and shelf supports of known designs and configurations and none of the disadvantages.

It is another object of the present invention to provide a new and improved wall mount shelving system which may be easily and efficiently manufactured and marketed.

It is further an object of the present invention to provide a new and improved wall mount shelving system which is of durable and reliable constructions.

An even further object of the present invention is to provide a new and improved wall mount shelving system which is susceptible of a low cost of manufacture with regard to both materials and labor, and which accordingly is then susceptible of low prices of sale to the consuming public, thereby making such wall mount shelving system economically available to the buying public.

Even still another object of the present invention is to provide a wall mount shelving system for coupling internally threaded cylindrical members including rods, pipes and tubes to flat surfaces and to each other.

Lastly, it is an object of the present invention to provide a mounting system comprising a cylindrical member having an end formed with threads and at least one axial slot there through for supporting a shelf and further comprising a generally cylindrical mounting plate having a circumference with threads adapted to releasably couple to the threads of a cylindrical member, the mounting plate having at least one hole there through for attachment to a recipient surface.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross sectional view of the mounting plate taken along line 3—3 of FIG. 2 coupled to a concrete wall.

FIG. 4 is a cross sectional view of the mounting plate taken along line 3—3 of FIG. 2 coupled to wall board.

FIG. 5 is a perspective showing of a mounting system constructed in accordance with an alternate embodiment of the invention.

FIG. 10 is a perspective illustration of a shelving system constructed in accordance with the principles of the present invention.

FIG. 11 is a cross-sectional view taken along line 11—11 of FIG. 10.

FIG. 14 is a front elevational view similar to FIG. 13 but illustrating an alternate embodiment of the invention.

FIG. 15 is an exploded perspective illustration of the system of FIG. 14.

The same reference numerals refer to the same parts throughout the various Figures.

DESCRIPTION OF THE PREFERRED EMBODIMENT

Figure 1:
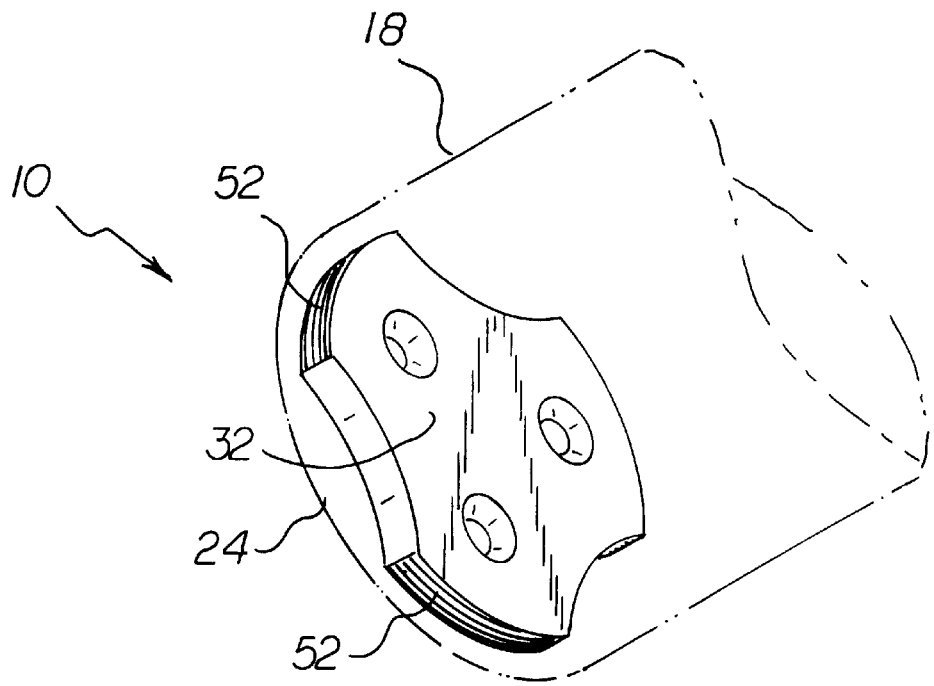
FIG. 1 is a perspective showing of a wall mount shelving system constructed in accordance with the principles of the present invention.
Figure 2:
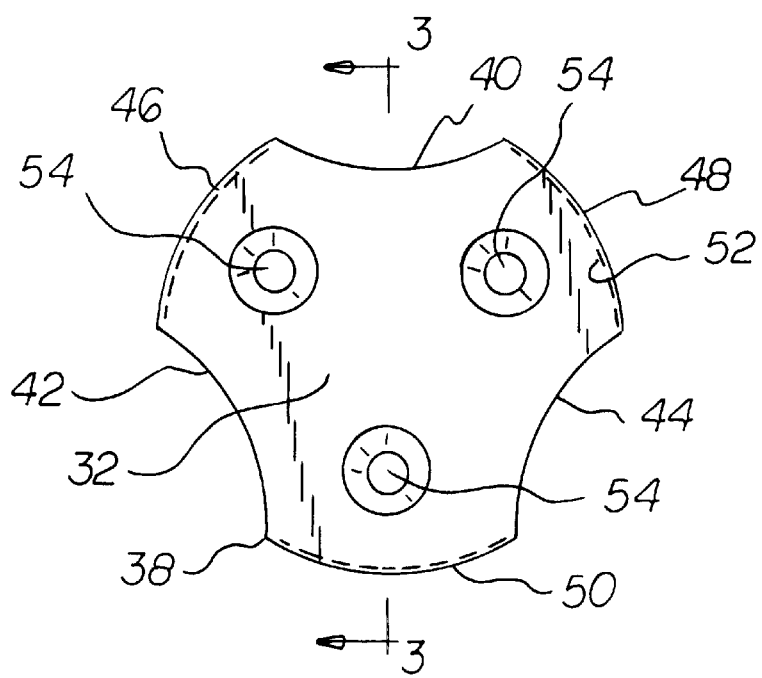
FIG. 2 is a front elevational view the mounting plate shown in FIG. 1.
Figure 8:
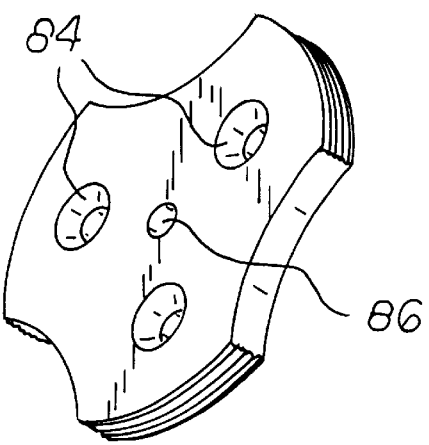
FIGS. 8 and 9 are perspective showings of two additional alternate embodiments of the invention.
Figure 7:
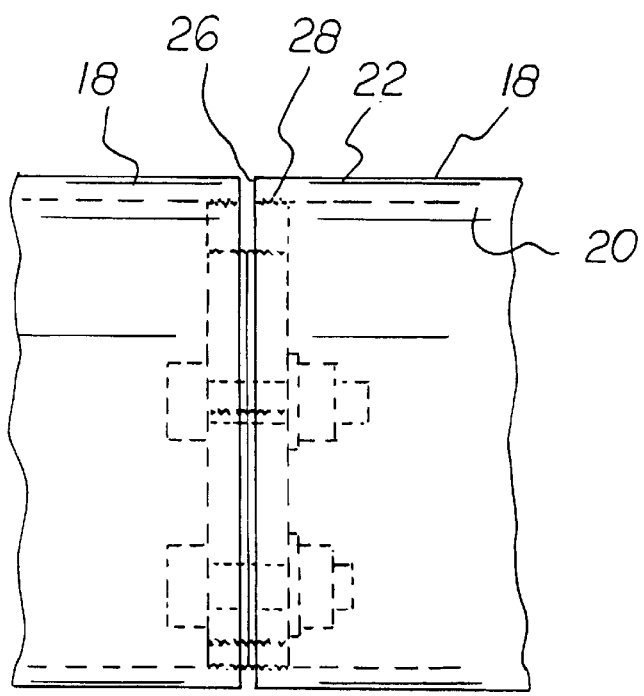
FIG. 7 is a side elevational view of the mounting plates of FIG. 6 with two pipes coupled together.
Figure 6:
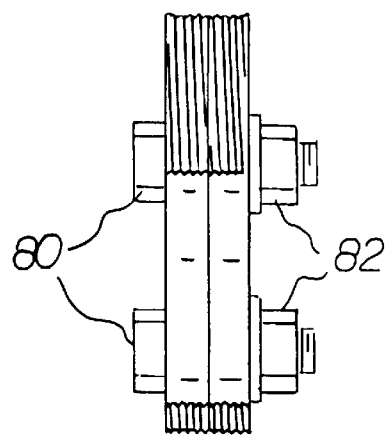
FIG. 6 is a side elevational view of two mounting plates of the FIG. 5 embodiment coupled together for joining two threaded pipes or tubes.
Figure 9:
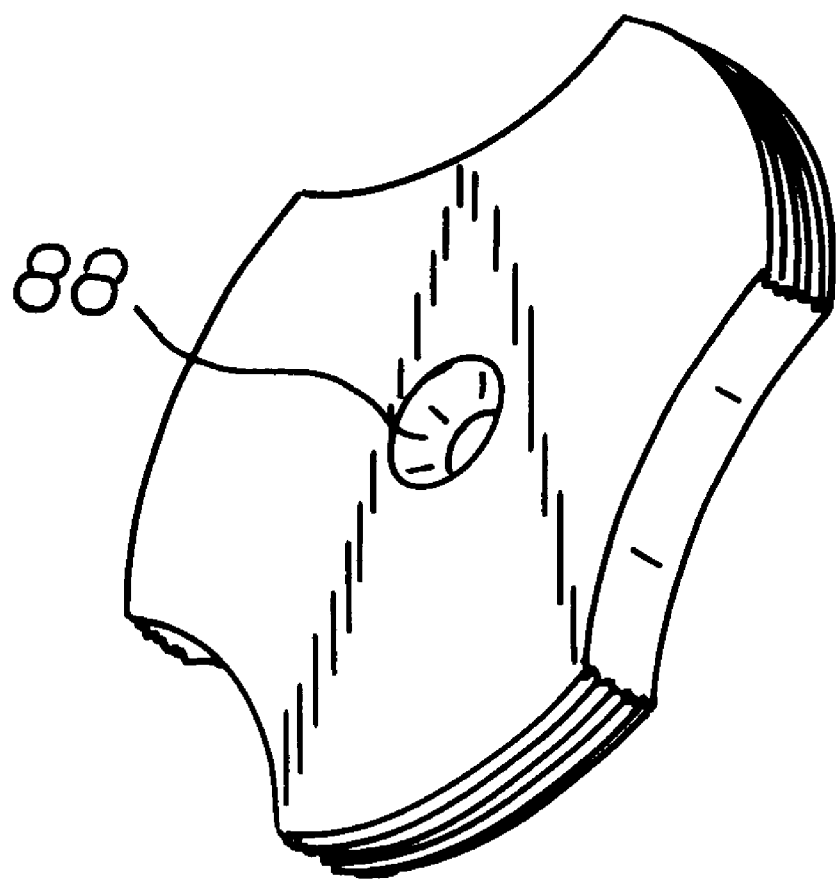
Figure 12:
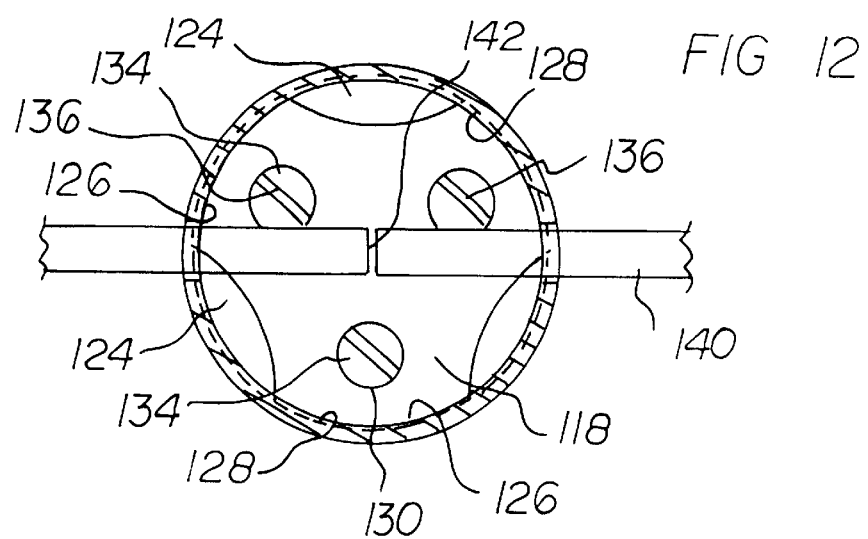
FIG. 12 is a cross-sectional view taken along line 12—12 of FIG. 11.
Figure 13:
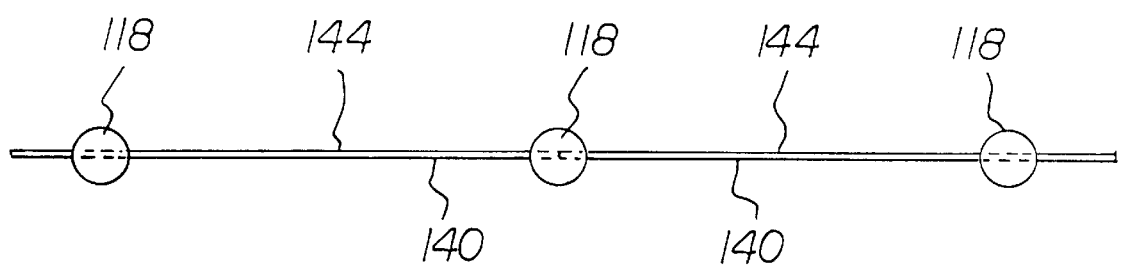
FIG. 13 is a front elevational view of the shelving system shown in FIG. 12.

With reference now to the drawings, and in particular to FIG. 1 thereof, the preferred embodiment of the new and improved wall mount shelving system embodying the principles and concepts of the present invention and generally designated by the reference numeral 10 will be described.

The present invention, the wall mount shelving system 10 is comprised of a plurality of components. Such components in their broadest context include a generally cylindrical mounting plate and at least one hole though the mounting plate. Such components are individually configured and correlated with respect to each other so as to attain the desired objective.

First provided is a vertically oriented, rigid, planar, recipient surface 14.

A cylindrical member 18 is next provided. The cylindrical member has an interior surface 20 and an exterior surface 22. The cylindrical member further has a first end 24. The first end has a first edge 26. The first end also has female threads 28. The female threads are formed in the interior surface adjacent to the first edge.

A mounting plate 32 is provided next. The mounting plate has an interior face 34 and an exterior face 36. The mounting plate has a generally cylindrical, thin, outer circumference 38. The circumference of the mounting plate has three arcuate concave regions 40, 42, 44. Each region is about 60 degrees, equally spaced around the circumference. The circumference of the mounting plate has three arcuate convex regions 46, 48, 50. Each region is about 60 degrees, equally spaced around the circumference between the concave regions. The convex regions each have male threads 52. The male threads are adapted to releasably couple to the threads of the cylindrical member. The mounting plate further has a central extent with three beveled holes 54 symmetrically located adjacent to the circumference in proximity to the convex regions. The beveled holes have a large aperture 56 opening in the exterior face of the mounting plate and a small aperture 58 opening into the interior face of the mounting plate. The interior face is adapted to lie flush with the recipient surface. One of the three concave regions is adapted to be positioned at the upper most extent of the recipient surface. In this manner the adjacent edges of the convex regions lie laterally spaced when coupled to the planar surface such that their adjacent edges lie in a horizontal plane for supporting a level.

Provided last are three set screws 62. The screws have a pointed end 64 and a head end 66. The screws also have a flared top portion. The flared top portion has a coupling recess 68 and male threads 70 there between. The screws are adapted to threadedly couple through the mounting plate into the recipient surface. In this manner the pointed end and threads pierce the planar surface and the head end lies within the beveled holes with the flared top portion lying flush with the top face of the mounting plate. The mounting plate may then threadedly receive and support the cylindrical member.

In an alternate embodiment of the present invention the system further includes a recipient surface of concrete 74.

In another alternate embodiment of the present invention the system further includes a recipient surface of wall board 76 and a stud 78.

In another alternate embodiment of the present invention the hole of the system includes three cylindrical holes symmetrically located adjacent to the circumference in proximity to the convex regions with bolts 80 and nuts 82 holding two mounting plates together for threadedly receiving and supporting two internally threaded cylindrical members end to end in axial alignment.

In still another alternate embodiment of the present invention the hole of the system includes three beveled holes 84. The beveled holes are symmetrically located adjacent to the circumference in proximity to the convex regions. One cylindrical hole 86 is located in the center of the mounting plate.

In yet another alternate embodiment of the present invention the hole of the system includes one beveled hole 88 located in the center of the mounting plate.

The mounting plate as well as the threaded cylindrical member are fabricated of a rigid material, preferably metal such as stainless steel. A wide range of other metals could also be utilized. In addition, these rigid parts could also be fabricated of a rigid plastic material, polyvinyl chloride (PVC), for example. The choice of materials is a function of the particular application.

The present invention has additional alternate embodiments relating to shelving systems for supporting shelves through internally threaded cylindrical members with slots for receiving the shelves. Such embodiments are illustrated in FIGS. 10 through 15.

With particular reference to FIGS. 10 through 13, there is shown an embodiment wherein each shelf is supported at each of its ends by a cylindrical member. More specifically, a shelving system 100 has a vertically oriented, rigid, planar, recipient surface 104. A pair of cylindrical members 106 is next provided. Each cylindrical member has a closed end 108 and an open end 110 with an interior surface and an exterior surface. Each cylindrical member further has female threads 112 formed in the interior surface adjacent to the open end. Each cylindrical member also has axial slots 114 there through at diametrically opposed locations. Each slot has a common short height circumferentially and a long length axially.

Next provided in this embodiment is a pair of mounting plates 118. Each mounting plate has an interior face 120 and an exterior face 122. The mounting plate has a generally cylindrical, thin, outer circumference. The circumference of each mounting plate has three arcuate concave regions 124. Each region is about 60 degrees. The regions are equally spaced around the circumference. The circumference of each mounting plate has three arcuate convex regions 126. Each of the convex regions is about 60 degrees. The convex regions are equally spaced around the circumference between the concave regions. The convex regions each have male threads 128 adapted to releasably couple to the threads of the cylindrical member. Each mounting plate further has a central extent with three beveled holes 130 symmetrically located adjacent to the circumference in proximity to the convex regions. The beveled holes have a large aperture opening in the exterior face of the mounting plate and a small aperture opening into the interior face of the mounting plate. The interior face is adapted to lie flush with the recipient surface at spaced locations at a common elevation so that the slots of the cylindrical members are in a common first horizontal plane. One of the three concave regions of each mounting plate is adapted to be positioned at the upper most extent of the recipient surface whereby adjacent edges of the convex regions lie laterally spaced when coupled to the planar surface such that their adjacent edges lie in a second horizontal plane above the first horizontal plane for supporting a level during mounting.

Next, in this embodiment, a plurality of set screws 134 are provided. Each set screw has a pointed end and a head end with a flared top portion with a coupling recess 136 and male threads there between. The screws are adapted to threadedly couple through the mounting plate into the recipient surface such that the pointed end and threads pierce the planar surface and the head end lies within the beveled holes with the flared top portion lying flush with the top face of the mounting plate so that the mounting plate may threadedly receive and support the cylindrical member.

Finally, in this embodiment, a rectangular rigid planar shelf 140 is provided. The shelf has opposed ends 142 with a central extent 144 there between. The shelf has a thickness slightly less than the height of the slots and a width slightly less than the length of the slots. The shelf has a length slightly greater than the distance between adjacent slots of the spaced cylindrical members and extends through and is supported by the slots of the cylindrical members.

With particular reference to FIGS. 14 and 15, there is shown another embodiment of the shelving system 150 wherein each shelf is supported by a cylindrical member at its center. First provided in this embodiment is a vertically oriented, rigid, planar, recipient surface. A cylindrical member 156 has a closed end 158 and an open end 160 with an interior surface and an exterior surface. The cylindrical member further has female threads 162 formed in the interior surface adjacent to the open end. The cylindrical member has axial slots 164 there through at diametrically opposed locations. Each slot has a common short height circumferentially and a long length axially.

A mounting plate 168 is next provided in this embodiment. The mounting plate has an interior face 170 and an exterior face 172. The mounting plate has a generally cylindrical, thin, outer circumference. The circumference of the mounting plate has three arcuate concave regions 174. Each region is about 60 degrees. The regions are equally spaced around the circumference. The circumference of the mounting plate has three arcuate convex regions 176. Each convex region is about 60 degrees. The regions are equally spaced around the circumference between the concave regions. The convex regions each have male threads 178 adapted to releasably couple to the threads of the cylindrical member. The mounting plate further has a central extent with three beveled holes 180 symmetrically located adjacent to the circumference in proximity to the convex regions. The beveled holes have a large aperture opening in the exterior face of the mounting plate and a small aperture opening into the interior face of the mounting plate. The interior face is adapted to lie flush with the recipient surface at spaced locations at a common elevation so that the slots of the cylindrical members are in a common first horizontal plane. One of the three concave regions of each mounting plate is adapted to be positioned at the upper most extent of the recipient surface whereby adjacent edges of the convex regions lie laterally spaced when coupled to the planar surface such that their adjacent edges lie in a second horizontal plane above the first horizontal plane for supporting a level during mounting.

Next provided in this embodiment is a plurality of set screws 184. The set screws have a pointed end and a head end with a flared top portion with a coupling recess 186 and male threads there between. The screws are adapted to threadedly couple through the mounting plate into the recipient surface such that the pointed end and threads pierce the planar surface and the head end lies within the beveled holes with the flared top portion lying flush with the top face of the mounting plate so that the mounting plate may threadedly receive and support the cylindrical member.

Finally, in this embodiment, a rectangular rigid planar shelf 190 is provided. The shelf has opposed ends 192 with a central extent 194 there between. The shelf has a thickness slightly less than the height of the slots and a width slightly less than the length of the slots. The shelf has a length greater than the distance between the slots of the cylindrical member and extends through and supported by the slots of the cylindrical members at adjacent to the central extent of the shelf.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A shelving system adapted for supporting shelves through internally threaded cylindrical members with slots for receiving the shelves comprising, in combination:

a vertically oriented, rigid, planar, recipient surface;

a pair of cylindrical members, each cylindrical member having a closed end and an open end with an interior surface and an exterior surface, each cylindrical member further having female threads formed in the interior surface adjacent to the open end, each cylindrical member having axial slots there through at diametrically opposed locations, each slot having a common short height circumferentially and a long length axially;

a pair of mounting plates, each mounting plate having an interior face and an exterior face with the mounting plate having a generally cylindrical, thin, outer circumference, the circumference of each mounting plate having three arcuate concave regions, each about 60 degrees, equally spaced around the circumference, the circumference of each mounting plate having three arcuate convex regions each about 60 degrees, equally spaced around the circumference between the concave regions, the convex regions each having male threads adapted to releasably couple to the threads of the cylindrical member, each mounting plate further having central extent with three beveled holes symmetrically located adjacent to the circumference in proximity to the convex regions, the beveled holes having a large aperture opening in the exterior face of the mounting plate and a small aperture opening into the interior face of the mounting plate, the interior face being adapted to lie flush with the recipient surface at spaced locations at a common elevation so that the slots of the cylindrical members are in a common first horizontal plane, one of the three concave regions of each mounting plate being adapted to be positioned at the upper most extent of the recipient surface whereby adjacent edges of the convex regions lie laterally spaced when coupled to the planar surface such that their adjacent edges lie in a second horizontal plane above the first horizontal plane for supporting a level during mounting;

a plurality of set screws having a pointed end and a head end with a flared top portion with a coupling recess and male threads there between, the screws being adapted to threadedly couple through the mounting plate into the recipient surface such that the pointed end and threads pierce the planar surface and the head end lies within the beveled holes with the flared top portion lying flush with the top face of the mounting plate so that the mounting plate may threadedly receive and support the cylindrical member; and a rectangular rigid planar shelf having opposed ends with a central extent there between, the shelf having a thickness slightly less than the height of the slots and a width slightly less than the length of the slots and a length slightly greater than the distance between adjacent slots of the spaced cylindrical members and extending through and supported by the slots of the cylindrical members.

2. A mounting system comprising:

a cylindrical member having an end formed with threads, the cylindrical member having at least one axial slot there through for supporting a shelf; and a generally cylindrical mounting plate having a circumference with threads adapted to releasably couple to the threads of the cylindrical member, the mounting plate having at least one hole there through for attachment to a recipient surface.

3. The system as set forth in claim 2 and further including a second cylindrical member and mounting plate for attachment to the recipient surface laterally offset from the cylindrical member and mounting plate and wherein the shelf is rectangular, rigid, and planar, the shelf having opposed ends with a central extent there between, the shelf extending through and supported adjacent to its opposed ends by the slots of the cylindrical members.

4. The system as set forth in claim 2 wherein the cylindrical member has two diametrically opposed axial slots and wherein the shelf is rectangular, rigid, and planar, the shelf having opposed ends with a central extent there between, the shelf extending through and supported adjacent to its central extent by the slots of the cylindrical members.

5. A shelving system adapted for supporting a shelf comprising:

a vertically oriented, rigid, planar, recipient surface;

a cylindrical member having a closed end and an open end with an interior surface and an exterior surface, the cylindrical member further having female threads formed in the interior surface adjacent to the open end, the cylindrical member having axial slots there through at diametrically opposed locations, each slot having a common short height circumferentially and a long length axially;

a mounting plate having an interior face and an exterior face with the mounting plate having a generally cylindrical, thin, outer circumference, the circumference of the mounting plate having three arcuate concave regions, each about 60 degrees, equally spaced around the circumference, the circumference of the mounting plate having three arcuate convex regions each about 60 degrees, equally spaced around the circumference between the concave regions, the convex regions each having male threads adapted to releasably couple to the threads of the cylindrical member, the mounting plate further having central extent with three beveled holes symmetrically located adjacent to the circumference in proximity to the convex regions, the beveled holes having a large aperture opening in the exterior face of the mounting plate and a small aperture opening into the interior face of the mounting plate, the interior face being adapted to lie flush with the recipient surface at spaced locations at a common elevation so that the slots of the cylindrical members are in a common first horizontal plane, one of the three concave regions of each mounting plate being adapted to be positioned at an upper most extent of the recipient surface whereby adjacent edges of the convex regions lie laterally spaced when coupled to the planar surface such that their adjacent edges lie in a second horizontal plane above the first horizontal plane for supporting a level during mounting;

a plurality of set screws having a pointed end and a head end with a flared top portion with a coupling recess and male threads there between, the screws being adapted to threadedly couple through the mounting plate into the recipient surface such that the pointed end and threads pierce the planar surface and the head end lies within the beveled holes with the flared top portion lying flush with the top face of the mounting plate so that the mounting plate may threadedly receive and support the cylindrical member; and a rectangular rigid planar shelf having opposed ends with a central extent there between, the shelf having a thickness slightly less than the height of the slots and a width slightly less than the length of the slots and a length greater than the distance between the slots of the cylindrical member and extending through and supported by the slots of the cylindrical members at adjacent to the central extent of the shelf.

* * * * *